United States Patent [19]
Hoelderich et al.

[11] Patent Number: 4,594,332
[45] Date of Patent: Jun. 10, 1986

[54] PREPARATION OF HARD, FRACTURE-RESISTANT CATALYSTS FROM ZEOLITE POWDER

[75] Inventors: Wolfgang Hoelderich, Frankenthal; Lothar Riekert, Karlsruhe; Michael Kotter, Bruchsal; Ulrich Hammon, Karlsruhe, all of Fed. Rep. of Germany

[73] Assignee: BASF Aktiengesellschaft, Fed. Rep. of Germany

[21] Appl. No.: 762,026

[22] Filed: Aug. 2, 1985

Related U.S. Application Data

[63] Continuation of Ser. No. 543,536, Oct. 20, 1983, abandoned.

[51] Int. Cl.$^4$ .............................................. B01J 29/28
[52] U.S. Cl. ......................................... 502/64; 502/62
[58] Field of Search ....................... 502/64, 62, 8, 71

[56] References Cited

U.S. PATENT DOCUMENTS

| | | | |
|---|---|---|---|
| 3,055,841 | 9/1962 | Gladrow et al. | 502/64 |
| 3,091,550 | 5/1963 | Doying | 502/62 X |
| 3,262,890 | 7/1966 | Mitchell et al. | 502/68 |
| 3,382,187 | 5/1968 | Drost | 502/64 X |
| 3,773,690 | 11/1973 | Heinze et al. | 502/8 |
| 4,295,994 | 10/1981 | Kulprathipanja | 502/62 |
| 4,298,501 | 11/1981 | Kulprathipanja | 502/62 |

Primary Examiner—Carl F. Dees
Attorney, Agent, or Firm—Keil and Weinkauf

[57] ABSTRACT

Hard, fracture-resistant catalysts are prepared from zeolites of the pentasil family by a process in which water, organic additives which increase the viscosity and a silicate are added to the zeolite powder, and the material is molded, dried and calcined.

The fracture-resistant zeolites obtained are used as catalyst carriers.

6 Claims, No Drawings

PREPARATION OF HARD, FRACTURE-RESISTANT CATALYSTS FROM ZEOLITE POWDER

This application is a continuation of application Ser. No. 543,536, filed on Oct. 20, 1983.

It is known that various types of zeolites can be used as catalysts or catalyst carriers. Depending on the preparation conditions, the synthetic zeolites obtained have particle sizes of from 0.1 to 20 μm. In order to enable them to be used as catalysts in fixed-bed reactors, the primary crystals have to be processed to mechanically stable, porous moldings by pressing in the dry or moist state (tabletting or extruding) or by pelletizing. The preparation and processing of porous zeolite materials can be carried out only if assistants (binders, lubricants) are added. If these are mineral additives which cannot be removed during the calcination process, their effect on the properties of the molded agglomerate with regard to the reaction should be taken into account. The zeolite material exhibits unusual behavior when moistened with water and during normal treatment by kneading and extrusion. After a paste has been made with water, the resulting viscous material can be converted to a thinly flowing slurry by thorough kneading; when a solid is added to this slurry, it first assumes a grainy consistency, but subsequent kneading renders it thinly flowing once again. Although the liquid can be converted to a paste again by adding a solid, the material obtained is by no means extrudable. Above a critical water/solids ratio, the material becomes liquid in the extruder or during passage through the die. Below this ratio, on the other hand, it solidifies in the region of the die to such an extent that further transport becomes impossible.

It is an object of the present invention to prepare mechanically stable moldings from zeolite powder which do not contain any clay minerals or $Al_2O_3$ as binders and do not possess the above disadvantages during processing.

We have found that this object is achieved, and that hard, fracture-resistant zeolite catalysts of the pentasil family are obtained, if water, organic additives which increase viscosity and a silicate are added to the zeolite powder, and the material is molded, dried and calcined.

Furthermore, the novel zeolite catalysts increase the selectivity of the conversion of methanol or dimethyl ether to lower olefins. Moreover, the method of preparation according to the invention has an advantageous effect on the time-on-stream of the catalyst.

The catalyst material can be molded by spraying in a spray tower or by kneading followed by extrusion. In the latter case, the strength of the extrudates can be increased if, after drying, they are impregnated with a solution of 2.5% of tetramethyl orthosilicate in carbon tetrachloride.

In a special embodiment of the process, for example, the zeolite powder is added to a mixture of water and hydroxyethylcellulose in a kneader until a highly viscous paste has formed; thereafter, a silicate is mixed with the resulting extrudable material while kneading, the material is extruded and the extrudates are dried and then calcined.

An advantage of molding the material by spraying is the possibility of continuously adjusting the particle size to that which is desirable for fluidized-bed catalysts.

Further treatment of the extrudates comprises drying, which is carried out in general at from 30° to 140° C., and calcining, which is effected at from 400° to 800° C.

A catalyst having a particularly high strength is obtained if drying is carried out so that the drying medium is highly saturated with water.

The unusual rheological behavior of the moist zeolite powder can be illustrated by means of a simple model: when the powder is moistened, it initially forms moist agglomerates which are held together by liquid bridges. Their mutual displacement is prevented by interlocking.

The same result is obtained if a solid is added to the liquid. In this case the primary particles are initially dispersed, but when a sufficient amount of solid is added agglomerates (lumps) will be formed whenever mixing of the solid with the liquid is not carried out homogeneously over the entire volume of the kneader. Long residence times in the kneader result in the agglomerates being broken up by the shearing forces continuously present in the sample chamber. The primary particles are surrounded by a liquid film and hence become mutually displaceable; the material becomes thinly flowing.

Since the material to be extruded is also subjected to shearing forces in the extruder and on passage through the die, the viscosity of the material may be reduced if the liquid content is sufficiently high. On the other hand, falling below a critical liquid/solids ratio results in the primary particles or agglomerates being compressed by pressure in the transport chamber and in particular before the die, so that, on direct contact with the solid particles, their displacement is prevented by adhesion and interlocking. By adding a macromolecular substance, the formation of agglomerates can be prevented, adhesion coupled with restricted mutual displacement of the primary particles can be effected and a liquid content (viscosity) which is optimum for the extrusion or pressing process can be established. The primary particles are held together by stable, macromolecule-containing liquid bridges, without their mutual displaceability being completely eliminated. Under the action of pressure, a structure of this type is stable within limits.

Although the dry moldings prepared with the addition of hydroxyethylcellulose (HEC) possess substantial strength (300N at 2% of HEC), this strength decreases sharply on calcination and removal of the additive used as a binder. However, if solid bridges of $SiO_2$ are formed in the porous structure by hydrolysis or thermal decomposition of a silicate, substantial compressive strength can be imparted to the calcined form. It may be assumed that the primary particles are first bound together by liquid bridges, which are then replaced by solid bridges during the drying process. Obviously, whether the bridge formers used are added directly to the moist material or in a second process step is only a minor consideration. With regard to the strength of the resulting extrudates, it appears to be unimportant whether hydrolysis of the added organic silicon compound takes place as early as the kneading and extruding stages or only subsequently.

The zeolite catalysts prepared in accordance with the invention are particularly hard and fracture-resistant. They are therefore more useful fluidized-bed catalysts for the conversion of methanol and/or dimethyl ether to hydrocarbons, in particular to $C_2$-$C_4$-olefins.

The SiO$_2$ formed in the agglomerates does not have a disadvantageous effect on the catalytic activity or the selectivity of the formation of lower olefins from dimethyl ether or methanol.

This method of producing mechanically stable moldings does not result in a reduction in the absorptivity of the zeolite material (cf. last column of the Table). Molecular sieves (zeolites) are employed in industry mainly for the separation of substances by absorption (eg. drying of gases). For these applications, too, it may be advantageous to use the process described above to prepare mechanically stable, macroporous agglomerates which contain less than 5% by weight of an inert binder.

The starting material used in the experiments described below was a finely crystalline zeolite powder which was shown by X-ray diffraction to belong to the pentasil family.

EXAMPLE 1

160 g of Aerosil and freshly precipitated Al(OH)$_3$ are introduced into 2,000 g of 25% strength hexamethylenediamine solution at 60° C. The Al(OH)$_3$ is prepared from 61.4 g of Al(NO$_3$)$_3$.9H$_2$O$_3$ by precipitation with ammonia. The molar ratio of SiO$_2$ to Al$_2$O$_3$ in the mixture is 32.6. The mixture is then stirred until it becomes homogeneous, after which it is heated in a steel autoclave for 5 days at 150° C. under autogenous pressure. The crystalline product is filtered off, washed, dried at 100° C. for 16 hours and calcined at 500° C. for 16 hours. According to X-ray analysis, the product consists of well crystallized aluminum zeolite.

EXAMPLE 2

Water and 2% of HEC are mixed in a kneader to give a viscous liquid, and zeolite powder is added to the liquid a little at a time until a highly viscous paste has formed. This material can be readily extruded. After drying and removal of the cellulose by calcination at 500° C. for two hours in air, highly macroporous moldings are obtained. The compressive strength of 4 mm extrudates of 10 mm length is 80N for surface loading. The properties of the extrudates obtained are reproduced in the Table.

EXAMPLE 3

The extrudable material whose preparation is described in Example 2 is kneaded with a silicate (in this case tetramethyl orthosilicate). Further treatment of the material is carried out as described in Example 2, and mechanically stable moldings are obtained. When 5% of bridge formers are added to these moldings, their compressive strength reaches the very high value of 340N (cf. Table 1).

EXAMPLE 4

Extrudates prepared by the process described in Example 2 are subsequently impregnated with a solution of 2.5% of tetramethyl orthosilicate in carbon tetrachloride, dried, and calcined for 2 hours at 500° C. The strength is more than tripled as a result of the additional process step (cf. Table 1).

EXAMPLE 5

The pentasil moldings prepared by processes 2, 3 and 4 are investigated, using a tube reactor, in respect of their behavior in the conversion of dimethyl ether at from 580 to 625 K. under a partial pressure of dimethyl ether of 39 mbar. At a catalyst loading of 0.15 mole of dimethyl ether per g per hour, the conversion is from 20 to 40% (cf. Table 1).

TABLE 1

Properties of extrudates prepared by different methods

| Process | Amount of SiO$_2$, % by weight (from tetramethyl silicate) | Strength (N) | Macroporosity (% by volume) | Reaction of dimethyl ether at 600K and p$_{DME}$ = 39 mbar in a differential reactor | | Absorption of n-hexane at 293K p$_{C6}$ = 0.5 mbar (% by weight) |
| | | | | Reaction velocity in mole g$^{-1}$s$^{-1}$ | % by weight of (C$_2$H$_4$ + C$_3$H$_6$) in the resulting hydrocarbons | |
| --- | --- | --- | --- | --- | --- | --- |
| (1) | — | 90 | 50 | 1.2 · 10$^{-5}$ | 31 | 8.1 |
| (2) | 5 | 340 | 50 | | | |
| (2) | 2.2 | 203 | 50 | 1.4 · 10$^{-5}$ | 32 | 7.9 |
| (3) | 2.5 | 270 | 50 | | | |
| (3) | 1.5 | 200 | 50 | 1.6 · 10$^{-5}$ | 31 | 8.0 |

EXAMPLES 6 AND 7

The zeolite catalyst (A) prepared as described in Example 3 is compared with a catalyst (B) which is prepared in a conventional manner from zeolite powder (Example 1) and boehmite in a ratio of 60:40. The conversion of methanol to lower olefins is chosen as the test reaction. Comparison of the test results (Table 2) shows that the yield of C$_2$–C$_4$-olefins is increased by the novel method of preparation. The methanol is converted quantitatively. The yields stated are based on CH$_2$ employed.

TABLE 2

| | Example | |
| Catalyst | 6 A | 7 B |
| --- | --- | --- |
| Temperature | 450° C. | |
| WHSV | 2.74$^{-1}$ | |
| CH$_3$OH | 25% | |
| CH$_4$ % | 1.5 | 1.5 |
| C$_2$H$_4$ % | 7.8 | 6.8 |
| C$_2$H$_6$ % | / | / |
| C$_3$H$_6$ % | 35.7 | 30.9 |
| C$_3$H$_8$ % | 1.2 | 1.3 |
| C$_4$ % | 18.1 | 15.6 |
| C$_5$+ % | 34.6 | 38.3 |
| +time-on-stream (hours) | 51 | 29 |
| g of CH$_3$OH/g of catalyst | 138 | 78 |

+time-on-stream until the first regeneration of the catalyst.

The time-on-stream, based on catalyst volume employed, of the zeolite catalyst is increased by the measure according to the invention.

EXAMPLE 8

A spray-dried zeolite catalyst which can be used as a fluidized-bed catalyst is prepared as described below.

The zeolite powder prepared as described in Example 1, water, 2% by weight of HEC and 2.5% by weight of tetramethyl orthosilicate are converted to a pumpable suspension. The solids content of this slurry is about 30% by weight. The suspension is sprayed in a spray drier to give a zeolite catalyst having a particle size of from 50 to 200 μm.

We claim:

1. A process for the preparation of a hard, fracture-resistant zeolite catalyst of the pentasil family, wherein water, hydroxyethylcellulose and a silicate are added to the zeolite powder, and the material is molded, dried and calcined.

2. A process for the preparation of a zeolite catalyst as claimed in claim 1, wherein molding is carried out by spraying the material in a spray tower.

3. A process for the preparation of a zeolite catalyst as claimed in claim 1, wherein molding is carried out by kneading the material and then extruding it.

4. A process as claimed in claim 3, wherein the extrudates are dried and then impregnated with a solution of 2.5% of tetramethyl orthosilicate in carbon tetrachloride.

5. The hard, fracture-resistant zeolite catalyst prepared by the process of claim 1.

6. The hard, fracture-resistant zeolite catalyst prepared by the process of claim 4.